3,412,001
PHOTOCHEMICAL PREPARATION OF MERCAPTANS
Joseph R. Edwards, Bartlesville, Okla., assignor to Phillips Petroleum Company, a corporation of Delaware
No Drawing. Filed Oct. 16, 1964, Ser. No. 404,510
3 Claims. (Cl. 204—162)

ABSTRACT OF THE DISCLOSURE

In the preparation of mercaptans by reacting olefins with hydrogen sulfide, in the presence of actinic light, the selectivity of the reaction is improved by carrying out the reaction such that the conversion level of the olefin into mercaptan is in the range of about 7 to 22 percent.

---

This invention relates to a process for the preparation of organic sulfur compounds. In one aspect this invention relates to a process for the preparation of mercaptans from hydrogen sulfide and ethylenically unsaturated compounds in the presence of ultraviolet light.

Organic sulfur compounds are of considerable industrial importance and processes for obtaining them economically from readily available chemicals are of considerable utility. In recent years, the industrial demand for mercaptans has increased to a high level. In order to obtain mercaptans by conventional methods using ultraviolet light promoted reactions, it is necessary to use high mol ratios of hydrogen sulfide to ethylenically unsaturated compounds to obtain high yields to the desired mercaptans. Such an operation results in the production of a reaction mixture having a very high concentration of hydrogen sulfide, the separation and recovery of which is expensive and time consuming. The production of mercaptans in continuous processes, using ultraviolet light, has also proven to be very expensive and time consuming because of the high mol ratios of hydrogen sulfide to ethylenically unsaturated compounds to obtain high yields of the desired mercaptans. Both batch and continuous conventional processes produce large amounts of undesirable products such as sulfides.

It is an object of this invention to provide an improved process for the preparation of organic sulfur compounds. Another object of this invention is to provide a process for the production of mercaptans by reaction of hydrogen sulfide with ethylenically unsaturated compounds in the presence of ultraviolet light. Another object of this invention is to provide an improved process for the production of mercaptans that can be economically carried out in a batch or continuous reaction process. Still another object of this invention is to provide a process for the production of mercaptans that produces a minimum of undesirable by-products, such as certain sulfides.

Other objects, aspects and advantages will be apparent to those skilled in the art by careful examination of the specification and the appended claims.

I have discovered that unexpected high yields of mercaptans can be obtained from a reaction of hydrogen sulfide and ethylenically unsaturated compounds in the presence of ultraviolet light by controlling the conversion level of the unsaturated compounds. By controlling the conversion level of the ethylenically unsaturated compounds it is possible to obtain a reaction product containing more than 90 percent of the theoretical ultimate yield of mercaptan based on the amount of converted unsaturated compound. By using my invention, it is now possible to commercially produce mercaptans under very economical conditions.

My unique method of obtaining a high yield of mercaptans with a minimum of undesirable by-products can be used to produce mercaptans from compounds having an ethylenic linkage. Generally, my process is used in making mercaptans from ethylenically unsaturated compounds having from 2–8 carbon atoms. Such unsaturated compounds include ethylene, propylene, butene-1, butene-2, isobutene, pentene-1, pentene-2, hexene-1, isopentene-1, 4-methyl-1-pentene, 4-methyl-2-pentene, vinyl cyclohexene, and the like.

In addition to the above named unsaturated hydrocarbons, the process of my invention can be employed in the reaction of hydrogen sulfide with ethylenically unsaturated compounds containing non-hydrocarbon groups. For example, the above-named ethylenically unsaturated hydrocarbons can contain such groups as halogens, particularly chlorine and bromine, hydroxyl, alkoxy, carboxy, carboalkoxy, alkenoxy, and the like. Specific examples of compounds of this type are vinyl chloride, vinyl bromide, allyl chloride, allyl alcohol, cyclohexenyl alcohol, 2-butene-1,4-diol, methylvinyl ether, divinyl ether, acrylic acid, ethyl acrylate, methyl methacrylate, maleic acid and the like.

My process is carried out in a conventional reactor having an ultraviolet light source disposed therein. Hydrogen sulfide and the unsaturated compound are charged to the reactor and the reaction takes place in the presence of the ultraviolet radiation. Under normal operations, the ethylenically unsaturated material and the hydrogen sulfide will be maintained in the liquid state under the vapor pressure of the reactants. It is desirable to provide a means for mixing the materials together to obtain the desired reaction. The hydrogen sulfide feed stock can be introduced into the lower end of the reactor in a gaseous state and bubbled through the liquid ethylenically unsaturated compound. Various means of mixing and shaking the reaction mixture are known in the art. The ultraviolet light source can be disposed outside the reactor and the reactor made transparent in whole or in part to the ultraviolet radiation by use of such materials as Pyrex (a registered trademark), Vycor (a registered trademark), and quartz. Such sources of ultraviolet radiation are conventional and need not be described in detail. One convenient method of introducing ultraviolet radiation into the reactor is by fitting the reactor with an immersion well that projects into the center of the reactor. The immersion well will be made of a material that allows the transmission of ultraviolet radiation through it and the ultraviolet radiation source will be disposed inside the immersion well. In most cases, the ultraviolet radiation source will also supply heat to the reaction mixture. Because of this added heat and the heat of reaction, it may be necessary to equip the reactor with cooling coils and the like to remove the undesired heat. This process can be conveniently carried out in a continuous operation and the unreacted hydrogen sulfide and ethylenically unsaturated compound can be returned to the reaction vessel after the mercaptan has been separated therefrom.

By closely controlling the conversion rate of the ethylenically unsaturated compound, the yield of mercaptan can be increased. I have found that by controlling the conversion level of the ethylenically unsaturated compound within a range of from 7–22 percent the yield of mercaptan is greatly increased to over 90 percent of the theoretical ultimate yield. By maintaining the conversion level of the unsaturated compound within these limits, the amount of undesirable sulfide compounds are reduced. I have found that the highest yields of mercaptans are obtained when the conversion level of the ethylenically unsaturated compound is maintained at about 12 percent. When the reaction is carried out and the conversion level of the unsaturated compound is maintained within these limits the amount of undesirable sulfides is kept at a minimum, thus allowing commercially desirable production of mercaptans.

Various methods of controlling the conversion level of the ethylenically unsaturated compound are available. In a batch process, probably the easiest method of controlling the conversion level of the ethylenicalliy unsaturated compound is by controlling the amount of ultraviolet radiation supplied to the reaction mixture. Thus by taking continuous samples of the reaction mixture and analyzing them, the conversion level of the ethylenically unsaturated compound can be continuously monitored. When the conversion level of the unsaturated compound reaches the desired level as designed above, the ultraviolet radiation can be interrupted. The mercaptan can then be separated from the reaction mixture by any suitable means, such as distillation. In a continuous process the conversion level can be conveniently controlled by regulating the residence time of the reaction mixture in the reaction vessel where the ultraviolet light source is located. The desired mercaptan product and small amount of by-products can be separated from the reaction mixture by distillation and the unconverted ethylenically unsaturated compound can be recycled to the reaction vessel.

In using this process, the mol ratio of the hydrogen sulfide to the ethylenically unsaturated compound in the reaction zone is maintained above a 1:1 ratio and can be as high as a 20:1 ratio. As the ratio of hydrogen sulfide to ethylenically unsaturated compounds is increased the yield of desirable mercaptans is also increased. However, as stated before, economic factors of handling the reaction mixture and separating it prevent high mol ratios. In determining the ratio of hydrogen sulfide to the ethylenically unsaturated compound, it is necessary to consider the value of the hydrogen sulfide, the cost involved in handling large volumes of it, and the cost involved in separating unreacted hydrogen sulfide from the reaction mixture. I have found that the preferred ratio is from 2–3 mols of hydrogen sulfide to each mol of ethylenically unsaturated compound. The temperatures and pressures in which this process can be carried out vary over a wide range. For example, the temperature can vary from $-50°$ to $300°$ F. The temperature in the reactor can be maintained by feed rates and withdrawal rates and/or the use of suitable cooling and/or heating means. For example, cooling coils can be disposed within the reaction mixture and in a jacket surrounding the jacket vessels. The pressure within the reaction vessels can also vary over a wide range. Preferably the pressure will be sufficient to maintain the ethylenically unsaturated compound as a liquid in the reaction zone.

Although the reaction described herein can be carried out by using the whole range of ultraviolet radiation, i.e., wavelengths in the range of 100–3800 Angstrom units, ultraviolet radiations having wave lengths below 2900 Angstrom units are preferred. The amount of radiation can vary over a wide range and will be dependent upon many factors, such as the particular unsaturated compound used as a reactant and the amount thereof, the source of the radiation, the conversion level of the unsaturated compound desired, and other considerations. Generally, however, the rate of ultraviolet radiation expressed in terms of r.e.p. (roentgen equivalent physical) per hour will be in the range between $1 \times 10^3$ to $1 \times 10^{10}$. The total radiation or dosage to the reaction mixture will be determined by the conversion level of the ethylenically unsaturated compound. In order to obtain a fast reaction that is desirable in commercial operations, the source of the ultraviolet radiation should not be unduly small. It is preferred to use a radiation source that is as large as practical, determined by the power requirements and speed at which the conversion level of the unsaturated compound can be controlled.

It is also within the scope of this invention to employ suitable diluents or solvents which are inert with respect to the reactants and the conditions of reaction. For example, the ethylenically unsaturated compound can be dissolved in benzene, toluene, gasoline, and the like.

The following example further illustrates the objects and advantages of this invention, but it should be understood that the various reactants, amounts, and other conditions recited in this example should not be construed so as to unduly limit the invention.

EXAMPLE

A mixture of hydrogen sulfide and butene-1 was charged to a 3-gallon autoclave in the ratio of 2 mols of hydrogen sulfide to 1 mol of butene-1. The reaction vessel was equipped with a mixer, a cooling coil, and a quartz immersion well containing a high pressure ultraviolet light. Two different size light sources were used in the test. The pressure in the reaction vessel was 200 p.s.i. at the start of the reaction. The reaction took place in the liquid phase under the vapor pressure of the system at the temperature of the reaction. The reaction temperature was maintained in the range of $90°$ to $130°$ F. Ultraviolet radiation from the lamp sources was applied to the reactants to initiate the reaction. Samples of the reaction mixture were obtained periodically for determining butene-1, mercaptan, and sulfide concentrations. The analysis was made by separating the fractions by distillation. The fractions were then analyzed by chromatography. The data obtained are expressed in terms of selectivity for the mercaptan product. The term *selectivity* as used here refers to the percent of theoretical ultimate yield of mercaptan with total recycle of unconverted olefin to the reaction mixture. The selectivity for the mercaptan product is numerically equal to the yield of mercaptan per pass, in mols, divided by the olefin conversion per pass, in mols times 100. The following data are shown to illustrate the percent mercaptan selectivity versus the percent olefin converted in the reaction.

RUN 1—450-WATT LAMP

| Percent Olefin Converted | Percent Mercaptan Selectivity |
|---|---|
| 4.5 | 86.7 |
| 9.0 | 92.2 |
| 13.0 | 95.3 |
| 17.0 | 91.7 |
| 37.5 | 89.1 |
| 57.0 | 78.7 |
| 71.0 | 74.0 |

RUN 2—200-WATT LAMP

| | |
|---|---|
| 11.2 | 96.5 |
| 14.4 | 97.2 |
| 21.0 | 94.2 |
| 74.4 | 89.3 |
| 84.0 | 68.7 |

It is seen that in all cases of the above examples the optimum or olefin conversion rate is in the range of 7–22 percent. At conversion levels above and below the 7–22 percent level, the mercaptan selectivity decreases to below 90 percent. The data illustrate the unexpected high yield of mercaptan and the unexpected low yield of undesirable by-products when the conversion level of the olefinic material is controlled.

Various modifications and alterations of this invention will be apparent to those skilled in the art from the foregoing discussion, and it should be understood that this invention is not to be limited to that set forth herein for illustrative purposes.

I claim:

1. In a method of preparing a mercaptan from an olefin containing from 2 to 8 carbon atoms which comprises reacting said olefin with hydrogen sulfide in the presence of actinic light wherein the mol ratio of hydrogen sulfide to said olefin is at least 1:1, the improvement which comprises controlling the conversion level of said olefin to within the range of about 7 to 22 percent and recovering said mercaptan from the reaction mass thus obtained.

2. In a method for preparing n-butyl mercaptan from butene-1 which comprises reacting butene-1 with hydrogen sulfide wherein the mol ratio of hydrogen sulfide to butene-1 is at least 1:1, maintaining said butene-1 in a liquid state, subjecting the reactants to light rays having wave lengths of below about 2900 Angstrom units, the improvement which comprises controlling the conversion level of said butene-1 at about 12 percent and recovering n-butyl mercaptan from the reaction mass thus obtained.

3. In a method for preparing a mercaptan from an ethylenically unsaturated compound containing 2–8 carbon atoms which comprises reacting said ethylenically unsaturated compound with hydrogen sulfide in the presence of light rays having wavelengths of below about 2900 Angstrom units wherein the mol ratio of hydrogen sulfide to said ethylenically unsaturated compound is at least 1:1, the improvement which comprises controlling the conversion level of said ethylenically unsaturated compound to within a range of 7 and 22 percent and recovering said mercaptan from the reaction mass thus obtained.

References Cited
UNITED STATES PATENTS

| | | | |
|---|---|---|---|
| 3,248,315 | 4/1966 | Warner et al. | 204—162 |
| 3,288,697 | 11/1966 | Whithson et al. | 204—162 |

HOWARD S. WILLIAMS, *Primary Examiner.*